US008578176B2

(12) United States Patent
Mattsson

(10) Patent No.: US 8,578,176 B2
(45) Date of Patent: *Nov. 5, 2013

(54) METHOD AND APPARATUS FOR TOKENIZATION OF SENSITIVE SETS OF CHARACTERS

(75) Inventor: Ulf Mattsson, Stamford, CT (US)

(73) Assignee: Protegrity Corporation, Grand Cayman (KY)

( * ) Notice: Subject to any disclaimer, the term of this patent is extended or adjusted under 35 U.S.C. 154(b) by 1279 days.

This patent is subject to a terminal disclaimer.

(21) Appl. No.: 12/076,970

(22) Filed: Mar. 26, 2008

(65) Prior Publication Data

US 2009/0249082 A1    Oct. 1, 2009

(51) Int. Cl.
*H04L 29/06*         (2006.01)

(52) U.S. Cl.
USPC ............................................. 713/193

(58) Field of Classification Search
USPC ............................................. 713/193
See application file for complete search history.

(56) References Cited

U.S. PATENT DOCUMENTS

| | | | | |
|---|---|---|---|---|
| 6,134,660 | A * | 10/2000 | Boneh et al. ................... | 713/193 |
| 7,120,933 | B2 | 10/2006 | Mattsson | |
| 7,305,707 | B2 | 12/2007 | Mattsson | |
| 2003/0037251 | A1* | 2/2003 | Frieder et al. ................. | 713/200 |
| 2003/0097596 | A1* | 5/2003 | Muratov et al. ............... | 713/202 |
| 2004/0103202 | A1* | 5/2004 | Hildebrand et al. ........... | 709/229 |
| 2006/0049255 | A1 | 3/2006 | Von Mueller et al. | |
| 2007/0208671 | A1* | 9/2007 | Brown et al. .................... | 705/65 |
| 2007/0271457 | A1* | 11/2007 | Patil et al. ........................ | 713/166 |
| 2007/0276765 | A1 | 11/2007 | Hazel et al. | |
| 2008/0170693 | A1* | 7/2008 | Spies et al. ..................... | 380/277 |
| 2009/0169016 | A1* | 7/2009 | Dodd ............................. | 380/278 |
| 2010/0074441 | A1* | 3/2010 | Pauker et al. .................... | 380/45 |

OTHER PUBLICATIONS

European Extended Search Report, European Application No. 08165284.4, Oct. 30, 2009, 6 pages.
European Examination Report, European Application No. 08165284.4, Jun. 29, 2010, 1 page.
European Examination Report, European Application No. 08165284.4, Feb. 19, 2013, 7 pages.

* cited by examiner

*Primary Examiner* — Michael S McNally
(74) *Attorney, Agent, or Firm* — Fenwick & West LLP

(57) ABSTRACT

A method and system for secure handling of sensitive sets of characters in a distributed hierarchical system are disclosed, comprising at least one local server on a lower hierarchic level and at least one central server at a higher hierarchic level. The method comprises the steps: receiving a sensitive set of characters in said local server; replacing a part of said sensitive set of characters with a token to form a tokenized set of characters, said token belonging to a subset of possible tokens assigned to the local server by the central server; transferring at least one of said sensitive set of characters and said tokenized set of characters to the central server; and canceling said sensitive set of characters from said local server within a limited time from said transferring, while maintaining said tokenized set of characters in a local database connected to said local server.

22 Claims, 6 Drawing Sheets

METHOD AND APPARATUS FOR TOKENIZATION OF SENSITIVE SETS OF CHARACTERS

FIELD OF THE INVENTION

The present invention relates to a system and a method for handling sensitive set of characters, such as credit card numbers, in a distributed hierarchical system comprising at least one local server on a lower hierarchic level and at least one central server at a higher hierarchic level. The distributed hierarchical system can e.g. be a computer system for a retail organization, with local servers at the point of sales, and central servers at centers or high quarters on regional and/or national level.

BACKGROUND OF THE INVENTION

Handling of sensitive sets of characters, such as credit card numbers, is often problematic. In a typical retail situation, the card is swiped at a register, and then transferred to a local server, where information about the transaction and the credit card number is stored. The information may also be stored at the registers. The information is also forwarded to servers at higher levels, such as a central server for the region, the nation etc. At all levels, it is important that enough information about the transaction is stored to render follow-up checks, audits, analysis etc. possible. However, at the same time the information stored on the servers is a security risk, and the risk is inevitably higher on the lower levels of the hierarchy. Even though the examples discussed in this application are mostly concerned with credit card numbers, similar type of problems are encountered in handling other sets of sensitive characters, such as social security numbers, driving license numbers, bank account numbers, etc. For example, social security numbers are in many systems less protected than credit card data.

The problem is often not that cryptography is no used, or used badly, but that the data itself is too weak to protect adequately—there are simply not enough possible credit card numbers, allowing an attacker routine measures to test them all using simple brute force techniques. While it may appear that a credit card number is 16 digits, and $10^{16}$ would be an insurmountably large number of tests, more than half of a card number is easily learned or is "guessable". First, the last four digits of a card number are normally not required to be secured, and are in fact helpfully printed on receipts, and are permitted to be present in the stored data. Thus, these digits may reside in register printer logs, sales data, etc. If I knew four digits and were to guess all the remaining digits, I would have to make only $10^{12}$ guesses instead of $10^{16}$. Further, credit association is identified by the first digit on a credit card: "4" for Visa, "5" for Mastercard, "3" for American Express, etc. This can be used in reverse. If a credit transaction identifies the association (by printing the word VISA, for example) I know the first digit of the credit card is a 4. Combined with the last four digits, I now have to make only $10^{11}$ guesses. In most markets around a country, there are also often only a handful of card issuing banks that will dominate any given area. There are perhaps a dozen truly cosmopolitan large cities that have a great diversity of credit cards, but in the vast majority of e.g. American heartland cities only a few banks issue a large fraction of the cards a retailer will see; perhaps as many as 50% of cards are issued by just 10 banks or so in a given region. A retailer with a private label Visa or Mastercard will have an even easier avenue of attack. The first 6 digits of a card number is devoted to the Bank Identification Number (BIN). If 10 banks issue 50% of the Visa cards used in a geographic region, that means I have one chance in ten of correctly identifying perhaps 50% of the BINs, if I know the region the card was used in. And ordinary merchant identification, such as a store number, will give me the region. Six digits is a lot to reduce the search space by: it gets me from $10^{12}$ to $10^{6}$ guesses; but with 10 possible BIN numbers to try I have to make $10^{7}$ guesses. In addition, the final digit of a credit card number is conventionally a check-sum digit, calculated by the so-called Luhn algorithm. Just because the check digit is computed and placed as the last digit does not mean I cannot use it to verify a test of an account number. I can generate a test case with the nine digits I know, generate six digits sequentially, and compute the check digit to recover the missing digit. Thus I start out knowing "ten" digits worth of a sixteen digit card number. I now have to test only $10^{6}$ digits. On a modern desktop that calculation would take 4 seconds or less. Further, there is the risk that protective algorithms present in cash register software can be obtained by thieves by the simple act of stealing a register's hard drive.

In this context, it is also to be remember that the goal of an attacker is very different from the goals of the retailer. The attacker is not trying to do the same job as a sales auditor, and does not have to identify every specific account number from any given protective scheme with 100% accuracy. The goal of an attacker is to acquire as many account numbers as easily as possible. With a stolen database of sales information, cracking even 25% of the valid credit card numbers would yield great profits.

There are in principle three different ways to render data unreadable: 1) Two-way cryptography with associated key management processes, 2) One-way transformations including truncation and one-way cryptographic hash functions, and 3) Index tokens and pads. Two-way encryption of sensitive data is one of the most effective means of preventing information disclosure and the resultant potential for fraud. Cryptographic technology is mature and well proven. The choice of encryption scheme and topology of the encryption solution is critical in deploying a secure, effective and reasonable control. Hash algorithms are one-way functions that turn a message into a fingerprint, usually not much more than a dozen bytes long. Truncation will discard part of the input field. These approaches can be used to reduce the cost of securing data fields in situations where you do not need the data to do business and you never need the original data back again. Tokenization is the act of replacing the original data field with reference or pointer to the actual data field. This enables you to store a reference pointer anywhere within your network or database systems. This approach can be used to reduce the cost of securing data fields along with proper network segmentation in situations where you do not need the data to do business, if you only need a reference to that data.

Thus, problems that need to be addressed in secure handling of sensitive sets of characters are e.g. that you typically do not want to outsource your data, since you cannot at the same time outsource your risk and liability. Accordingly, an organization will normally not be willing to move the risk from its environment into a potentially less secure hosted environment. Further, you normally need to maintain certain information about transactions at in the point of sales (POS), as well as on higher levels. In most retail systems, there are a plurality of applications that use or store card data, from the POS to the data warehouse, as well as sales audit, loss prevention, and finance. At the same time, the system need to be adequately protected from attacks from data thieves. Still further, protective measures cannot be allowed to be to complicated, cumbersome and expensive. Accordingly, there is a need for an improved way to adequately protect the complete flow of data and still support the interdependencies among and referential integrity across the system.

SUMMARY OF THE INVENTION

It is therefore an object of the present invention to provide an improved method and a system for secure handling of sensitive sets of characters in a distributed hierarchical system alleviating the above-discussed disadvantages and problems of the prior art.

This object is achieved with a method and a system according to the appended claims.

According to the invention, there is provided a method for secure handling of sensitive sets of characters in a distributed hierarchical system comprising at least one local server on a lower hierarchic level and at least one central server at a higher hierarchic level, said method comprising the steps:

receiving a sensitive set of characters in said local server;

replacing a part of said sensitive set of characters with a token to form a tokenized set of characters, said token belonging to a subset of possible tokens assigned to the local server by the central server;

transferring at least one of said sensitive set of characters and said tokenized set of characters to the central server; and canceling said sensitive set of characters from said local server within a limited time from said transferring, while maintaining said tokenized set of characters in a local database connected to said local server.

The term "characters" is herein used to indicate any alphanumerical values. Accordingly, the sensitive set of characters can consist of solely numerical digits, as is typically the case for credit card numbers, bank account numbers, social security numbers, driver license numbers and birth certificate numbers. However, the sensitive set of characters can alternatively consist of solely alphabetic letters, or a combination of letters and numbers. The sensitive set of characters is preferably at least one of a number associated with personal information related to an individual, such as a social security number, and a number associated with financial holdings and transactions, such as a credit card number or a bank account number.

The present invention provides a very high degree of security, and is at the same time very efficient, with relatively low demands on the communication network and the processing capabilities. A specific advantage is that the local servers can operate as stand-alone units at times when they are not connected to the central server, since the tokenization occurs locally, and there is no need to have access to the central server around the clock. Further, the system is highly predictable, since the tokens used by each local server belong to a dedicated subset of possible tokens assigned to each local server. The present invention is also operable within existing systems, and can easily be used directly in any organization's system, thus avoiding any need for outsourcing of vital functions, and hosting of third parties.

Since tokens are used to replace only a part of each sensitive set of characters, whereby each tokenized set of characters still contains at least one of the original characters, the tokenized sets of characters may still be used for analysis, follow-ups etc when e.g. the characters containing certain information, such as the BIN codes of credit card numbers, can be maintained.

The present invention is especially useful in a distributed system for retail industry, and can e.g. be compliant with the Payment Card Industry (PCI) Data Security Standard (DSS). By means of the present invention the risk exposure can be minimized, but still allowing merchants to get to their data for business needs.

The sensitive set of characters preferably comprises at least one subsets of characters generated in a random fashion, wherein in said step of replacing said part to be replaced is contained within said subset of random characters. For example, a credit card number typically comprises some initial digits indicating issuing organization, country, etc, and at least one checksum digit at the end, whereas the remaining digits are typically generated in a random fashion. Further, the sensitive set of characters preferably comprises at least 16 characters, wherein said subset to be replaced by a token comprises at least 6 characters.

The canceling of the sensitive set of characters from said local server is preferably performed regularly, and preferably at least once every 24 hours. For example, the cancellation may take place after business hours every working day.

The subset of possible tokens assigned to the local server by the central server is preferably assigned in the form of a list mapping at least one token value to each possible digit combination of the part of said sensitive set of characters to be replaced, said list being transferred from the central server to said local server. In order to increase the security further, the list is preferably replaced regularly in said local server. In case the hierarchical system comprises at least two local servers, the list may be a general list assigned to all said local servers, or a unique local list assigned to each of said local servers, so that the local lists comprise tokens belonging to different subsets of possible tokens. The list may map at least two token values to each possible digit combination of the part of said sensitive set of characters to be replaced, wherein the choice between said at least two token values is preferably made by random.

Alternatively, the local server generates the tokens algorithmically based on the characters to be replaced, said algorithm being arranged to provide tokens only within a subset of possible tokens assigned to the local server by the central server, and wherein said subset is a unique local subset assigned to each of a plurality of local servers, said local lists comprising tokens belonging to different subsets of possible tokens.

The method according to the invention may further comprise the step of generating a hash value for said sensitive set of characters, and storing said hash value in association with said tokenized set of characters in the local database connected to said local server. This further reduces the need to maintain the original set of sensitive characters at lower levels of the hierarchy. Hash values may be used on some or all levels of the hierarchical system.

In a preferred embodiment, the system in said lower hierarchic level comprises at least one primary local server and at least one secondary local server, said primary local servers being of a higher hierarchic level than said secondary local servers, comprising the steps of:

receiving a sensitive set of characters in said secondary local server;

transferring said sensitive set of characters to said primary local server;

canceling said sensitive set of characters from said primary local server within a limited time from said transferring;

replacing, in said primary local server, a part of said sensitive set of characters with a token to form a tokenized set of characters, said token belonging to a subset of possible tokens assigned to the primary local server by the central server;

transferring, from said primary local server, at least one of said sensitive set of characters and said tokenized set of characters to the central server; and canceling said sensitive set of characters from said primary local server within a limited time from said transferring, while maintaining said tokenized set of characters in a local database connected to said local server.

In an also preferred embodiment, the system in said higher hierarchic level comprises at least one primary central server and at least one secondary central server, said primary central servers being of a higher hierarchic level than said secondary central servers, comprising the further steps of:

receiving, in a secondary central server, from said local server, at least one of said sensitive set of characters and said tokenized set of characters to the central server;

replacing, in said secondary central server, a part of said sensitive set of characters with a second token to form a second tokenized set of characters, said second token belonging to a subset of possible tokens assigned to the secondary central server by the primary central server;

transferring, from said secondary local server, at least one of said sensitive set of characters and said second tokenized set of characters to the central server; and maintaining said sensitive set of characters, said tokenized set of characters received from the local server and said second tokenized set of characters in a central database connected to at least one of said primary and secondary central server.

The tokenized set of characters received from the local server is preferably a transient token, providing a unique set of characters for each reception of a sensitive set of characters, and wherein the second tokenized set of characters is a persistent token, providing a unique set of characters for each set of sensitive characters, but being persistent to each occurrence of said set of sensitive characters.

Further, the primary central server preferably replaces a part of said sensitive set of characters with a third token to form a third tokenized set of characters, wherein third tokenized set of characters is a personal identifying information token, providing a unique set of characters for each individual, but being persistent to each set of sensitive characters associated to said individual.

As a further protective measure, a trap database may be provided and connected to the at least one of said primary and secondary central server in order to attract intruders.

The set of sensitive characters is preferably transferred between at least two units in said system in encrypted form. Further, the key for said encryption is preferably renewed regularly, wherein a new key is generated based on the current key, and wherein the current key is subsequently erased in units of lower hierarchic level.

As an extra security measure, the frequency of replacing a part of a sensitive set of characters with a token to form a tokenized set of characters within each local server may be continuously monitored. This "velocity checker" may be used to issue an alarm if a determined threshold level is exceeded, whereby attempts to receive information about the tokenization process may be hindered.

Alternatively or additionally, it is also possible to use intrusion detection based on intrusion detection profiles for different user for improving the security of the database(s). Such intrusion detection methods are e.g. described in U.S. Pat. No. 7,120,933 and U.S. Pat. No. 7,305,707, both by the same applicant, said patents hereby incorporated by reference.

The subset of possible tokens may be assigned to the local server by the central server in the form of at least one range of numerical or alphanumerical token values reserved by the central server for each one of said at least one local server, for dynamic generation of token values by said local server within said range. Alternatively, the subset of possible tokens may be assigned to the local server by the central server in the form of a static list provided by the central server, said list mapping every possible digit combination of said part of said sensitive set of characters to be replaced to at least one token value.

The steps of receiving a sensitive set of characters in the local server and replacing a part of said sensitive set of characters with a token to form a tokenized set of characters are preferably performed locally at said local server, without any communication with the central server. Hereby, the need for constant communication is avoided, and the local server can operate even when disconnected.

As a further option, the step of replacing a part of the sensitive set of characters with a token to form a tokenized set of characters may further comprise the sub-step of performing a check-sum test for the last digit of said tokenized set of characters, and, in case the result of said check-sum test is unsatisfactory, repeating said step of replacing with another token until said check-sum test is satisfied. If the check-sum digit is correct, the tokenized set of characters may be mistaken for an original sensitive set of characters. Thus, for some applications, the result of the check-sum test may be deemed unsatisfactory if the check-sum digit is correct, whereas for other applications, the result of the check-sum test may be deemed unsatisfactory if the check-sum digit is incorrect.

Alternatively or additionally, it is also possible to use a special indicator in the tokens, to make the tokenized set of characters clearly recognizable, and to make certain that the tokenized set of characters is not mistaken for e.g. a valid credit card number. For example, the special indicator may be the character "T". Further, the special indicator may be assigned a certain position in the token, such as the first position in the token.

According to another aspect of the present invention, there is provided a system for secure handling and storing of sensitive sets of characters, said system comprising a distributed hierarchical environment with at least one local server on a lower hierarchic level and at least one central server at a higher hierarchic level, said at least one local server comprising:

means for receiving a sensitive set of characters in said local server;

means for replacing a part of said sensitive set of characters with a token to form a tokenized set of characters, said token belonging to a subset of possible tokens assigned to the local server by the central server;

means for transferring at least one of said sensitive set of characters and said tokenized set of characters to the central server; and means for canceling said sensitive set of characters from said local server within a limited time from said transferring, while maintaining said tokenized set of characters in a local database connected to said local server.

According to this aspect, similar advantages as discussed above in relation to the first feature are obtainable, and the preferable features as discussed above are also applicable in relation to this aspect of the invention.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
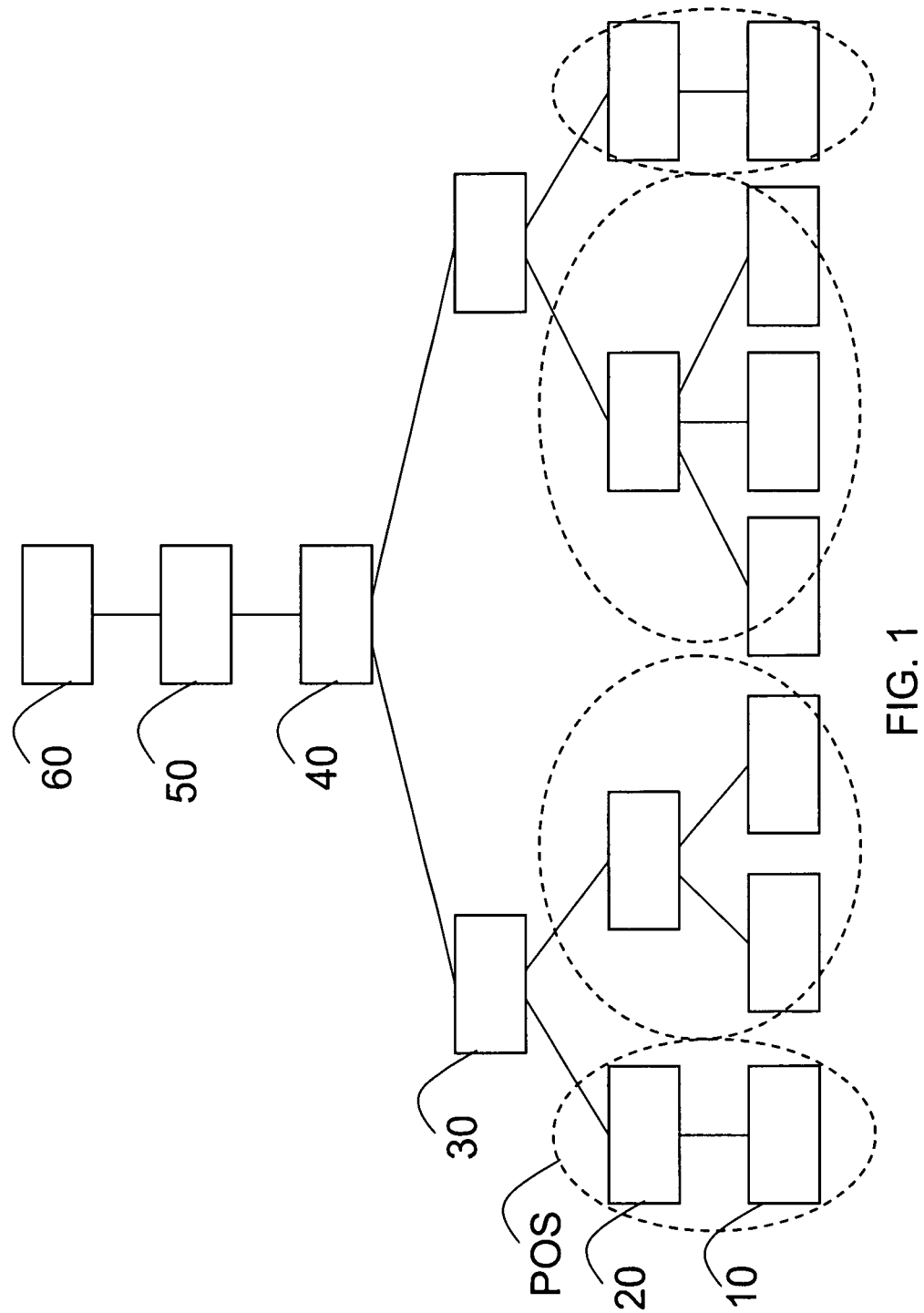
FIG. 1 is a schematic overview of a hierarchical system for handling sensitive sets of characters in accordance with an embodiment of the present invention.

With reference to FIG. 1, a hierarchical system for handling sensitive sets of characters is schematically illustrated. The system comprises registers 10 connected to a local server 20. Each local server 20 defines a point of sale (POS), illustrated with dashed lines, and each local server 20 may be connected to a plurality of registers 10. In large retail stores, a local server may be connected to hundreds of registers. The local servers at different POS are connected to one or several central server(s). In this example, the local servers are connected to two different regional servers 30, each serving a specific region or district. The regional servers 30 are connected to a national server 40, which in turn is connected to a global server 50, which in turn is connected to a central head quarter server 60. Even though not illustrated in this drawing, it should be acknowledged that each server can be connected to one or several servers on a lower level. Further, further hierarchical levels are also feasible, as well as fewer levels. For example, in a less vast system, all local servers may be connected directly to a single central sever.

Figure 2:
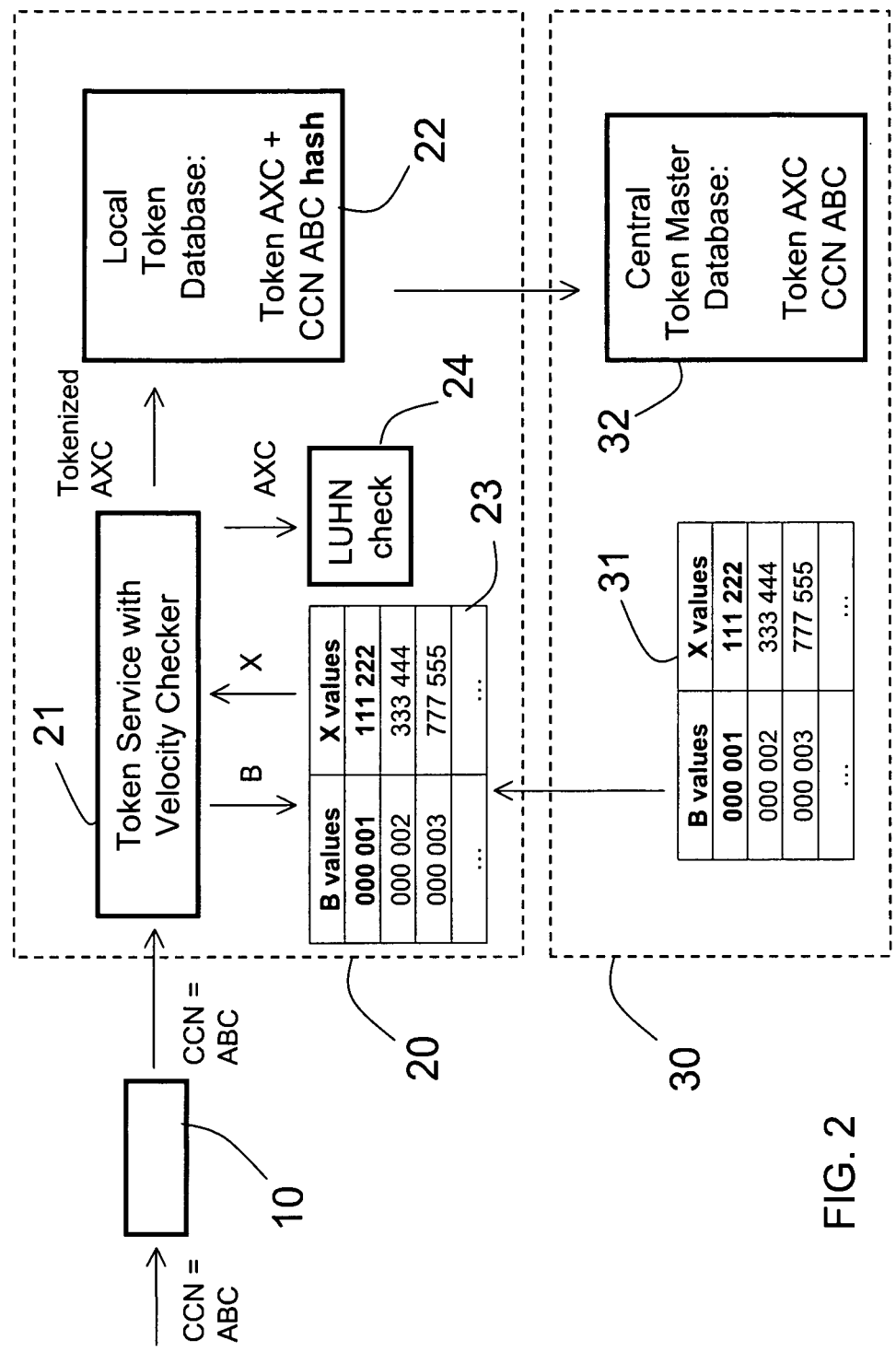
FIG. 2 is a schematic illustration of a first embodiment of tokenization with the present invention.

A first embodiment of the present system and method is schematically illustrated in FIG. 2. In this example, Credit Card Numbers (CCN) are registered at the registers 10. The CCN is of the form ABC, where A is the BIN, which is normally 6 digits, B is a random number, typically 12 digits long, and C is the final digits, e.g. the last 4 digits, typically including a final check digit. The check digit may typically be calculated in accordance with the Luhn algorithm. The CCN is transmitted from the register 10, and received in the local server 20. The local server comprises a processor 21, which embodies a token service, and optionally also with a velocity checker. In this embodiment, the Token service uses a static table 23, corresponding to an identical table 31 generated by a central server 30. The static table maps every possible B value with a corresponding unique token X. In the case where a 6 digit B is used, 1 million alternative B values exist, and correspondingly the table comprises the same number of entries. The X values can be numerical or alphanumerical values, and are preferably of the same length as the B values, i.e. in this example 6 digits. Consequently, the token service identifies a token corresponding to the received B value, and replaces the B value with the token X to form a tokenized set of characters AXC.

As an extra security measure, the processor 21 may also comprise a velocity checker for monitoring the frequency of replacing a part of CCNs with a token to form tokenized sets of characters. In particular, the velocity checker can be used to detect a peek in the frequency of requests from a certain user/client. The velocity checker may be used to issue an alarm if a determined threshold level is exceeded.

Further, it is also possible to add a check-sum test 24 for the tokenized set of characters AXC. This test may evaluate if the final digit in C is a correct digit in accordance with a check-sum test, e.g. following the Luhn algorithm. If the check-sum digit is correct, the tokenized set of characters may be mistaken for an original sensitive set of characters. Thus, for some applications, the result of the check-sum test may be deemed unsatisfactory if the check-sum digit is correct, whereas for other applications, the result of the check-sum test may be deemed unsatisfactory if the check-sum digit is incorrect. In case the result of said check-sum test is unsatisfactory, the step of replacing section B with a token X may be repeated with another token until said check-sum test is satisfied.

The tokenized set of characters AXC is stored in a local token database 22 in or connected to the local server 20. This database stores the tokenized set of characters AXC, and possibly in combination with the original CCN value ABC and/or a hashed version of ABC. Since many applications that uses CCN values are primarily looking at the A and/or C part of the number, such applications may instead be operated on the tokenized values AXC stored in the local token database.

Further, the tokenized set of characters AXC is transferred to the central server 30, to be stored in a central token master database 32. The central token master database 32 stores the tokenized sets of characters AXC in connection with the original CCN values ABC. If a static list is used, as in the above-discussed example, it is sufficient to transfer AXC from the local server, since the mapping of the tokens with corresponding B values is also known by the server, and can be used in a reveres process in the central server. However, it is also possible to transfer both the tokenized value AXC and the corresponding original value ABC from the local server to the central server.

The transfer of tokenized sets of data from the local server to the central server may occur immediately, but may also be delayed. For example, it is possible to transfer the information to the central server periodically, such as every hour, or once a day, such as during the night when the store is closed.

If the original CCN is stored in the local server, this is only temporary, and the sensitive sets of characters CCN are cancelled from the local server regularly within a limited time from said transferring, while maintaining said tokenized set of characters in the local database connected to the local server. The original CCNs can e.g. be cancelled once a day, immediately after closing hours, once every second or third day, once every week or the like. More frequent cancellation may also be used, such as within a specified time limit, e.g. within the range 1-15 minutes after the transfer.

All communication between the registers 10 and the local server 20, as well as between the local server 20 and the central server 30 may be encrypted.

The above-discussed example uses a static list to map the place to replaced with a token. In order to increase the security further, the list is preferably replaced regularly in said local server. In case the hierarchical system comprises several local servers, the list may be a general list assigned to all said local servers, or a unique local list assigned to each of said local servers, so that the local lists comprise tokens belonging to different subsets of possible tokens.

It is also possible to use a list that map at least two token values to each possible digit combination of the part of said sensitive set of characters to be replaced, wherein the choice between said at least two token values is preferably made by random. This increases the security even further. In such an embodiment, a counter may be used to guarantee the uniqueness of each concatenation of the part to be replaced, i.e. B, and the counter value. This may lead to doublets, i.e. several tokenized character sets for a single CCN, but this may be handled at higher levels, as is discussed in more detail in the following.

The list may also be based on a part of the sensitive set of characters not to be replaced, e.g. the C part in the ABC example used above. Thus, the list may comprise a plurality of tokens for each possible C value, such as a 100 different tokens assigned to each C value, and the C value together with a counter value is used to identify an X value to replace B to form the tokenized set of AXC. The replacement is preferably preceded by a step of checking if the original CCN already has a token in the token database, and if so, this token can be used again.

Figure 3:
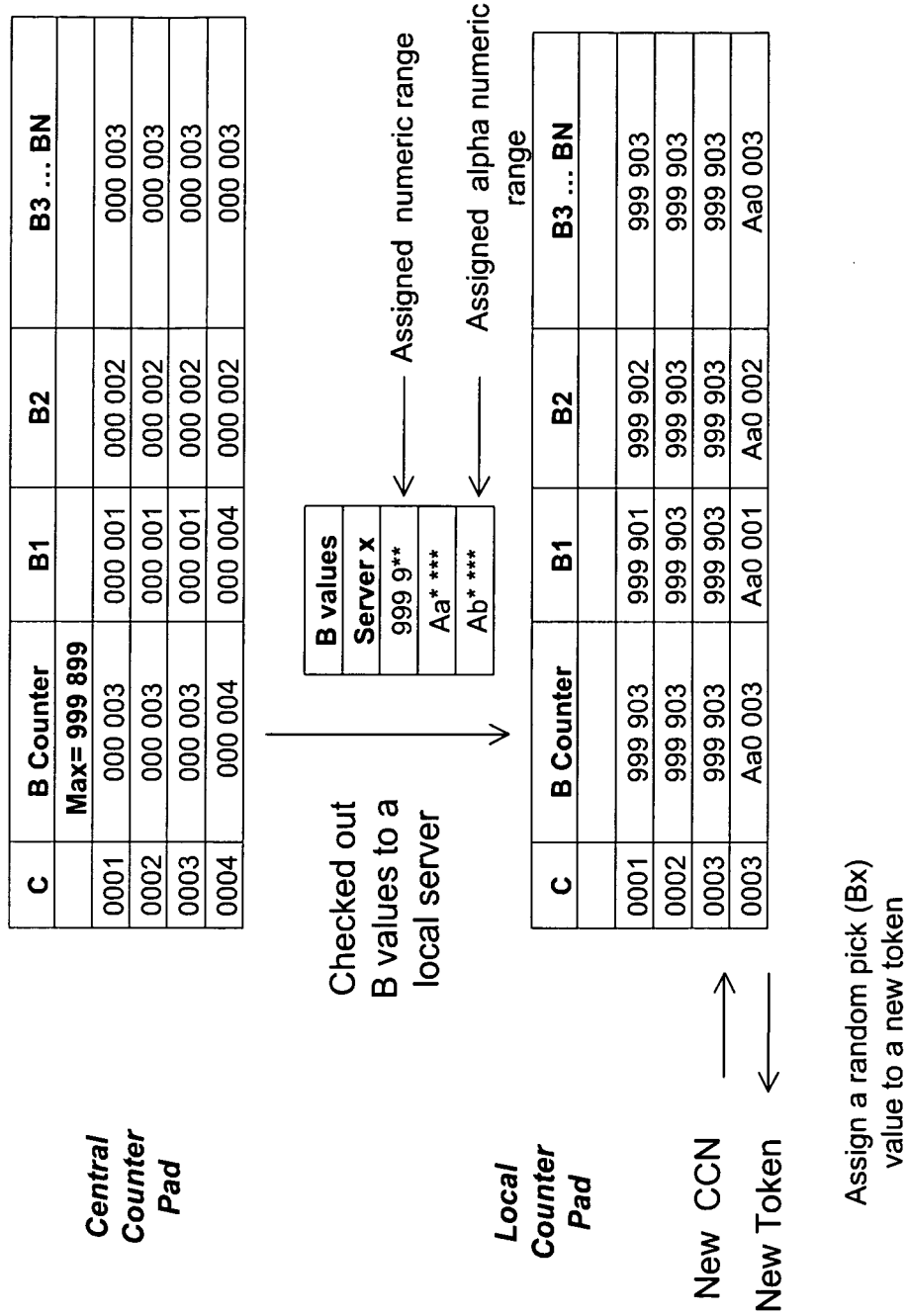
FIG. 3 is a schematic illustration of a second embodiment of tokenization with the present invention.

An example of such an alternative embodiment of local token assignment is illustrated in FIG. 3. Here, the C value together with a B counter B1-BN are used for determination of a token to replace the B value. Thus, a CCN of the format ABC is used as an input, and the C value is used to determine an X to be used in an output tokenized set of characters AXC. The local server checks out a subset of tokens for local token assignment, e.g. in the form of numerical and/or alphanumerical sub ranges. In this example, the local server is assigned the sub ranges 999 9** (i.e. sub range 999 900-999 999), Aa* *** (i.e. sub range AaA AAA to Aaz zzz), and sub range Ab* ***. The local token assignment can be based on an algorithm used in the local server, or by a static list assigning a token to every useable combination of C and B counter. The B counter can preferably be randomized, whereby the pick of a certain B counter value, of e.g. 100 available alternatives, for each C value is made at random.

Alternatively, the local server may generate the tokens algorithmically based on the characters to be replaced, said algorithm being arranged to provide tokens only within a subset of possible tokens assigned to the local server by the central server, and wherein said subset is a unique local subset assigned to each of a plurality of local servers, said local lists comprising tokens belonging to different subsets of possible tokens.

A hash value for said sensitive set of characters may also be generated, and stored in association with the tokenized set of characters in the local database connected to said local server, and/or in databases at higher levels of the hierarchical system. The hash value is preferably obtained by means of an iterative cryptographic has function, such as MD5 or SHA-1. It is also preferred to use a keyed Hash Message Authentication Code (HMAC).

Figure 4:
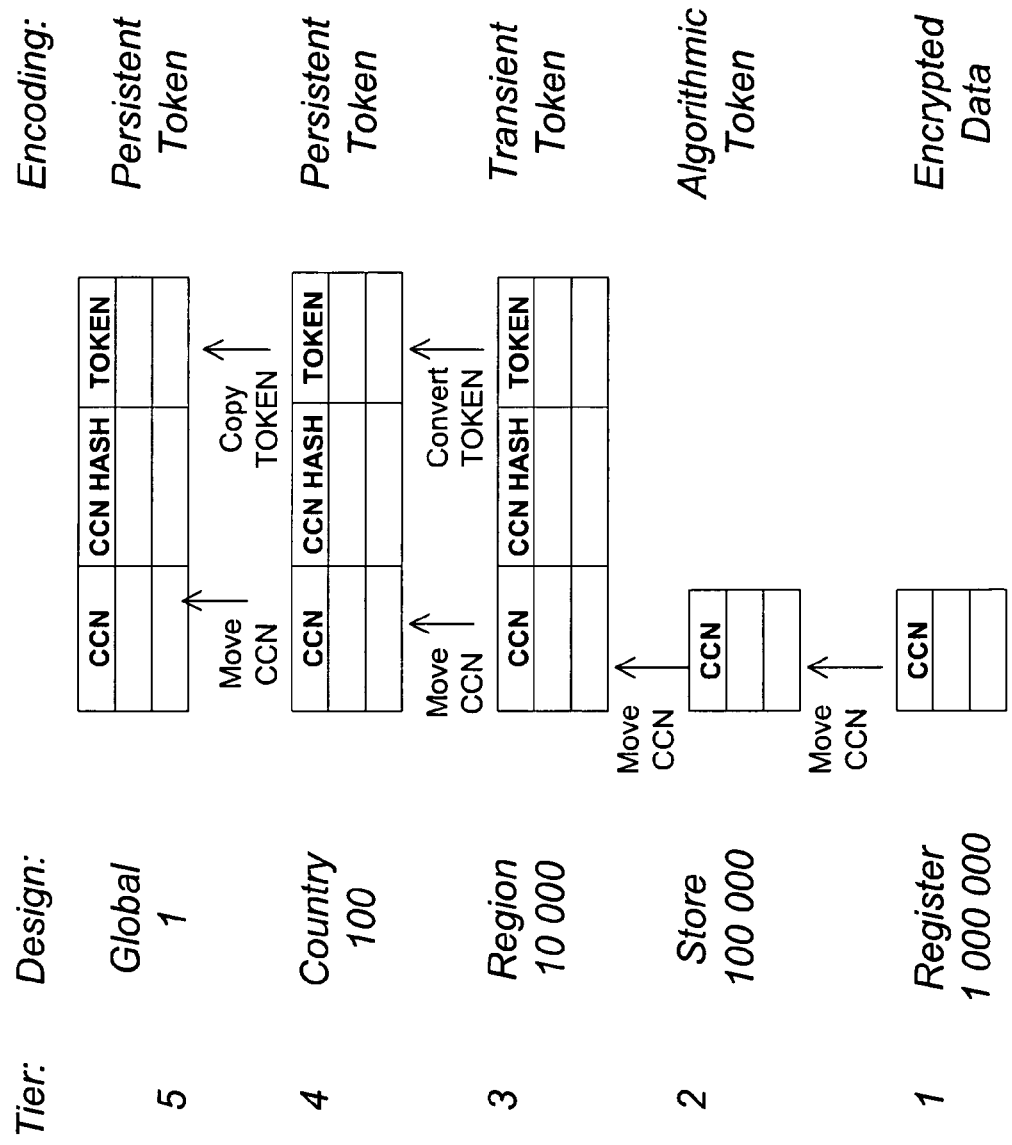
FIG. 4 is a schematic illustration of an embodiment using different tokens at different level.

In one exemplary embodiment, illustrated schematically in FIG. 4, the system in said lower hierarchic level comprises at least one primary local server, in tier 3 at Region level, and at least one secondary local server, in tier 2 at Store level. Further, the system comprises a secondary central server at Country level, tier 4, and a primary central server at Global level, tier 1.

In this case, the local server at Store level (tier 2) receives information about CCN numbers from registers at tier 1 as encrypted data. The information is subsequently cancelled from the registers. The local server in the stores generate an algorithmic token, e.g. based on a table or an encryption algorithm, as discussed above, for the CCN, and transfers it to the local server at a regional level. Thereafter, within a certain time period, the CCNs are removed from the local servers at the store level. The CCN is converted to a hashed CCN hash value and to a transient token in the regional server. Thereafter, the CCN is transferred to the country server at tier 4 together with the transient token, and the CCN is, within a certain time, removed from the regional server. At the country server, the CCN is again converted into a hashed CCN hash value, and into a persistent token. The CCN and persistent token are subsequently moved to the global server at tier 5, and within a certain time period, the CCN is removed from the country server. All the tokens may be generated in any of the different ways discussed above, and it is also possible to use different methods for generation of each of the different tokens. The algorithmic token used at lower levels is only a temporary token, and used only for a limited time. The transient token is preferably unique for each transaction, but the same CCN may generate duplicates at different transaction occasions. The persistent token is preferably unique for each CCN. As discussed in the following example, it is also possible to assign a Personal Identifiable Information (PII) token at higher level servers, said PII token being unique for any individual, even though more than one CCN is assigned to said individual.

Thus, in the above-discussed example, the servers at tier 2 will, after a certain time, not have access to any information related to the CCNs. The servers at tier 3 will have access to information about the hashed CCN hash values and associated transient token sets, but not to the original CCN values. The servers at tier 4 will also have access to hashed CCN hash values, and thereto associated persistent token sets. At the server at tier 5, a database comprising both the original CCNs, hashed CCNs and persistent token sets will be available.

The above-discussed architecture is suitable for large organizations, having e.g. 1 million registers on tier 1, connected to 100 000 stores on level 2, in about 10 000 regions in 100 countries. However, in less vast organizations, fewer hierarchical levels may be used.

Figure 5:
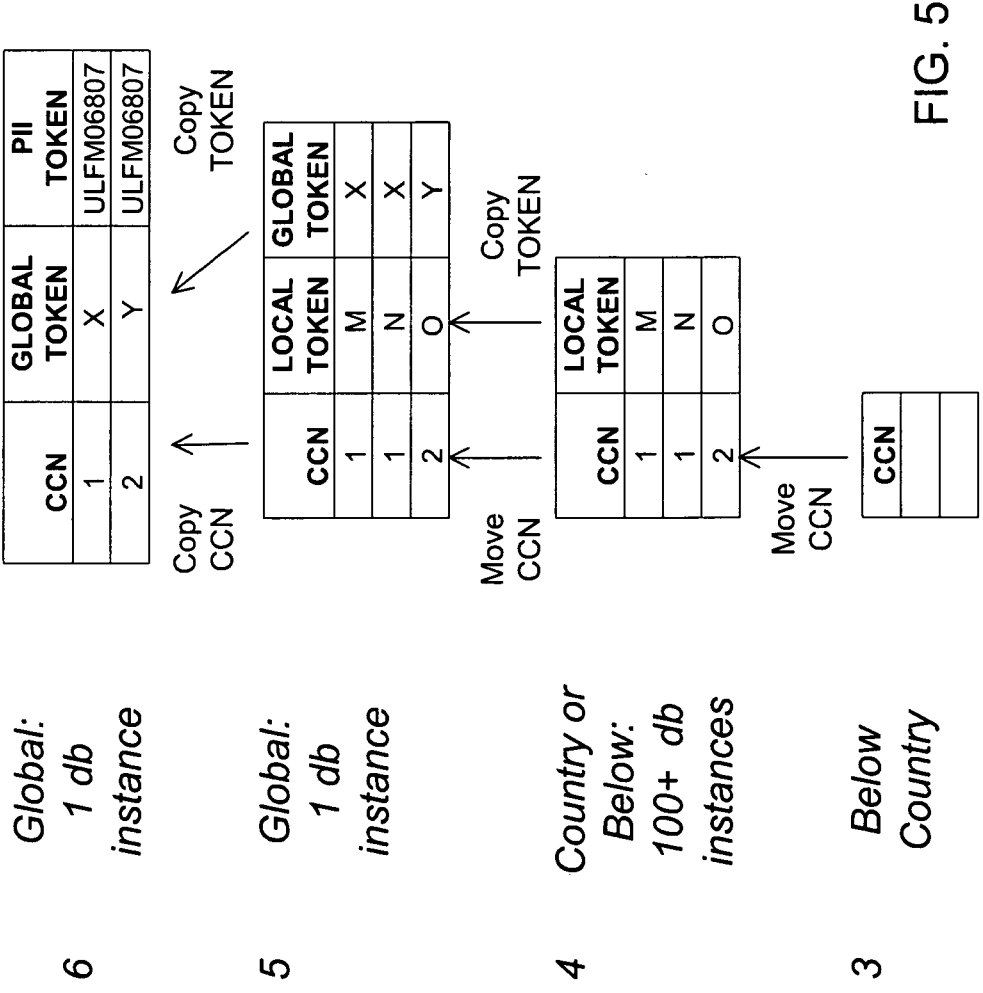
FIG. 5 is a schematic illustration of an example of the principles indicated in FIG. 4.

A more specific example is illustrated schematically in FIG. 5. In this example, CCNs are moved from a local server on tier 3 to a server on tier 4. In this server, each transaction is assigned a local token (transient token). In the specific example, CCN no 1 is assigned local token no M at the first transaction, and local token no N at next transaction. CCN no 2 is assigned local token O. The CCN and local tokens are transferred to a server at tier 5, and the original CCNs are removed from the lower level servers. The local token is preferably of an alphanumerical format. At the server at tier 5, each CCN is further assigned a global token. Thus, in the example CCN no 1 is assigned a global token X, whereas CCN no 2 is assigned a global token Y. The global token and the original CCN may further be copied to another central server at tier 6, where each individual is further assigned a PII token. In the illustrative example, CCN no 1 and CCN no 2 belongs to the same individual, and are both assigned the same PII token ULFM06807.

Based on the above-discussed system with databases of different content at various levels, data processing applications may be operated at each level but still maintaining a high level of security. For example, databases at store levels or below, temporarily comprising information about the CCN, may be used for data applications such as authorization, transaction logs, archive and reports. Databases at a higher level, comprising local tokens may be used for applications involved with settlements, charge back and fraud analysis. Databases at still higher levels, comprising both original CCNs, local tokens and global tokens, and possibly also PII tokens, may be used for basket analysis applications and the like.

Even though the above-discussed examples are solely concerned with a system and method handling credit card numbers (CCN), it should be appreciated by persons skilled in the art that similar methods and systems may also be used for secure handling of other sensitive sets of characters, such as social security numbers (SSN), driver license numbers, bank account numbers, and the like. The sensitive sets of characters may be of different formats, such as
- a) 6 digits clear, 6 digits randomized, and to be replaced by a token, and 4 digits clear (6+6+4), as in a standard CCN;
- b) 4 digits clear, 8 digits randomized, and to be replaced by a token, and 4 digits clear (4+8+4);
- c) 12 digits randomized, and to be replaced by a token, and 4 digits clear (12+4);
- d) 21 digits randomized, and to be replaced by a token, and 4 digits clear (21+4); and
- e) 15 digits randomized, and to be replaced by a token, and 1 digit clear (15+1).

However, other types of formats are also feasible.

Alternatively or additionally, it is also possible to use a special indicator in the tokens, to make the tokenized set of characters clearly recognizable, and to make certain that the tokenized set of characters is not mistaken for e.g. a valid credit card number. For example, the special indicator may be the character "T". Further, the special indicator may be assigned a certain position in the token, such as the first position in the token. Some examples with a special indicator "T" in the first position of the private data (middle part) in the token to explicitly signal that this is not a valid credit card number is, with a length 16:

4_x_4: 1302 T8710940 0123
6_x_4: 1302 11T4 7410 0123
0_x_4: T356 7787 9836 0123
0_x_0: T553 6187 1643 4475

Thus, with the possibility of using a special indicator, various options to use Luhn checksum or not exist:
1. Luhn (checksum) value not used; all-random private data
2. Luhn value verified; must be valid
3. Luhn value verified; mustn't be valid
4. Luhn value not used; token indicator 'T' set As discussed above, the x (the middle part, to be replaced by the token) can also be wholly or partly alpha-numeric instead of numeric, such as e.g.: 123456 abcdEF 1234

For the encrypted data transfer between lower level servers and higher level servers it is preferred that to exchange keys frequently. In the following, a preferred key derivation scheme is discussed, with reference to FIG. 6.

With this method e.g. each retail store encryption service may use a unique key for each day, yet never hold any information which would allow the determination of any key previously used by this encryption service, nor of any key which has been or will be used by any other retail store encryption service. The higher level server, e.g. the head quarter encryption service can determine the current transaction key used by any retail store encryption service from 1) the non-secret information contained in the day's Key-Generation, and 2) a Data Element Key.

The data element key resides in an encryption service which relies exclusively on physical barriers, such as in the head quarter encryption services, but should not reside in any retail store (e.g., POS's) encryption service. It is used to generate the retail store encryption service's unique initial store key using the data element, and can be used to generate the unique initial store keys for many retail store encryption services. The data element key is preferably a double-length or triple-length key. The data element preferably comprises three subfields. The left-most subfield is a key generation which is used to select the data element key appropriate to the encryption service retail store at the present day. The second subfield is an encryption service store ID, and the concatenation of the key generation store ID and the Encryption service store ID is encrypted using the selected data element key. The result is the initial store key which is loaded into the retail store encryption service, but subsequently erased from this encryption service. The third subfield is an encryption day. The retail store encryption service should preferably increase its encryption day for each day. The retail store encryption service should preferably cease operation when its encryption day overflows to zero. The HQ encryption service should preferably verify that the originator's encryption service encryption day in the key-generation has increased.

The initial store key and the encryption day are inputs to a non-reversible transformation process which produces the transaction key used for the current day. The initially loaded key is a function of the data element key, the key generation, and the encryption service store ID. Therefore no two retail store encryption services will be given the same initial store keys provided that no two retail store encryption services with the same key generation have identical encryption service store IDs.

Figure 6:
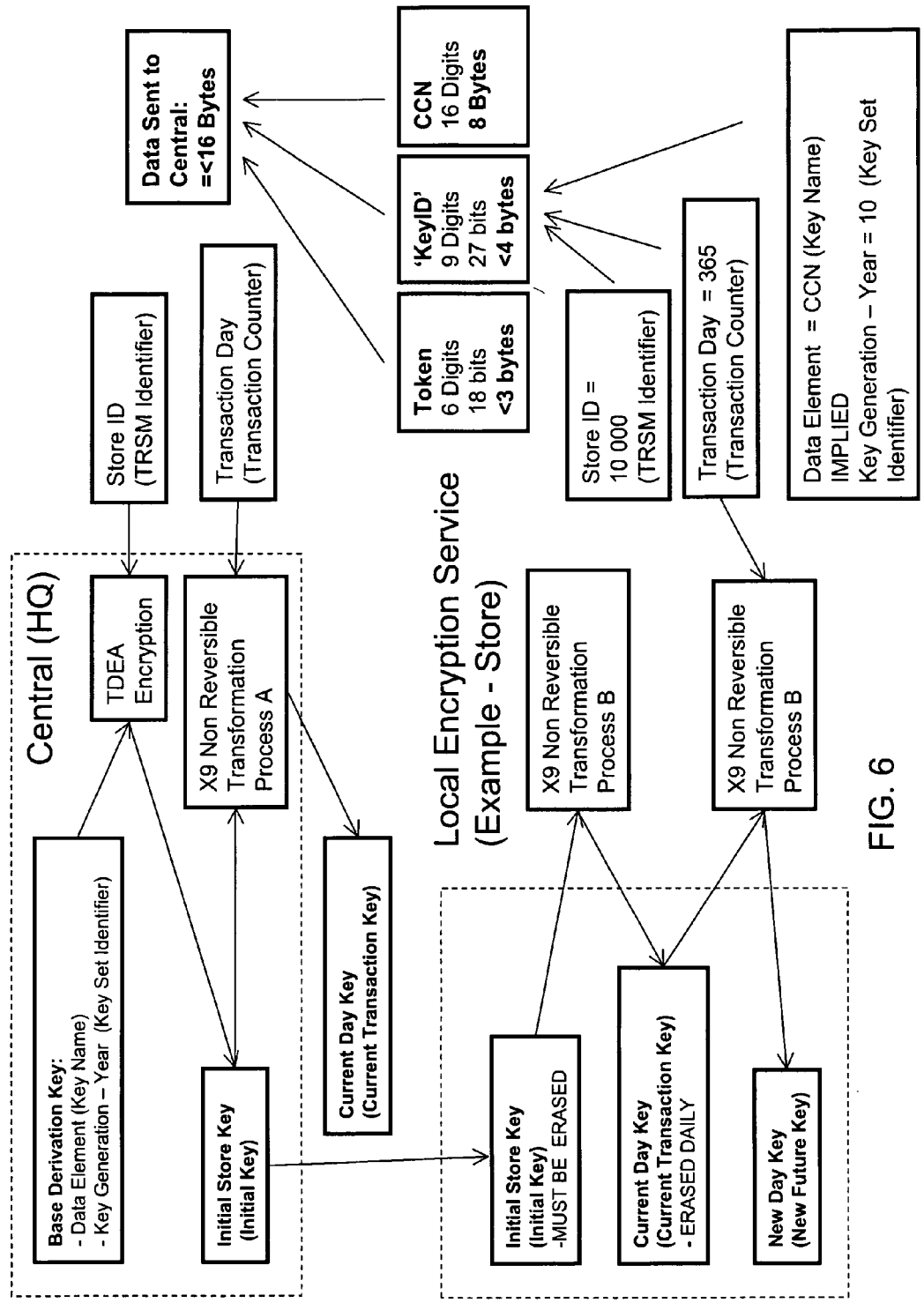
FIG. 6 is a schematic illustration of a key derivation scheme that may be used in combination with the tokenization scheme of the present invention.

The retail store encryption service generates and uses a current transaction key such that the HQ encryption service can determine that key using the process shown in FIG. 6. The retail store encryption service also erases all record of the current transaction key immediately after completion of the current day.

An example of how this method operates at the retail store encryption service is shown in FIG. 6. This encryption service stores a number of future keys. At the beginning of a new day, the encryption day is incremented, and then is used to select one of these future keys as the current transaction key. The selected key is erased from future key storage. The data element is transmitted in the key-generation with the current day. At the completion of the day, some number of future keys (sometimes none, sometimes one or more) are generated by non-reversibly transforming the current transaction key as a function of the encryption day. These newly generated future keys are then stored into those locations in future key storage determined by the encryption day. The current transaction key is then erased. Therefore, the encryption service retains no information about any key used for any previous day. In FIG. 6, the non-reversible transformation processes 'A' and 'B' are different but related. Future keys are generated, stored, and selected at the retail store encryption service in a manner such that the HQ encryption service is able to determine the current transaction key.

As a further protective measure, a trap database may also be provided at the central server(s) comprising information about the original CCNs. Such a trap database preferably comprises fake CCNs, and is used as a "honey pot" to attract intruders. This may be used both to fool intruders, and for detecting attempts to break into the database systems.

Tokenization is like network segmentation, as a way to move card data to another internal or external server. However, the access to the card data is still in your point of sale or other systems, so there is still a need to be careful of how a tokenized system can be attacked. For example, by combining standard encryption with an approach to encryption in which sensitive data is centralized and tokenized, organizations can benefits in terms of security, efficiency, and cost savings for some application areas within an enterprise. Tokenization combined with an enterprise class encryption solution can be the fastest way to substantially reduce the risk to certain sensitive data. Protection of the complete 'flow of data' and supporting the interdependencies among and referential integrity across systems can be supported by a tokenization solution combined with an enterprise class encryption solution. As discussed above, an attractive solution to this problem can be tokenization that is the act of replacing the original data field with reference or pointer to the actual data field. The tokenization enables you to store a reference pointer anywhere within your network or database systems and can be used to reduce the cost of securing data fields but will normally require a central service to assign permanent (persistent) token values. Tokenization by a local service can be used to assign a non-permanent token value at multiple end points early in the data flow. A tokenization system should preferably be supported by a rigorous encryption system based on separation of duties, secure audit, random key generation and protection of keys and credentials.

Security administrators must determine where to keep payment data and where it shouldn't be kept. It's pretty obvious that the fewer repositories housing credit card information, the fewer points of exposure and the lower the cost of encryption and PCI initiatives. Before security administrators dedicate the time and money to encrypting data, it must be assessed whether that data needs to be retained at all, and if not, take steps to remove it immediately. If it is determined, e.g. for business reasons, that some credit card data should be stored on a particular system, administrators must then decide how to optimize the storage and management of that data. Efficient tokenizing will often require a solid encryption and key management system both at the heart of the tokenizer (might even be distribute) and to encrypt data that cannot be tokenized in a cost effective manner.

Tokenization is often based on two key facets in an enterprise: First-Centralization of sensitive information. All credit card numbers stored in disparate business applications and databases are removed from those systems and placed in a highly secure, centralized encryption management server that can be protected and monitored utilizing robust encryption technology. Tokenization is like network segmentation, as a way to move card data to another internal or external server. However, the access to the card data is still in your POS or other systems, so be careful of how a tokenized system can be attacked. Secondly, tokenization of information. Each credit card number that previously resided on an application or database is replaced with a token that references the credit card number. A token can be thought of as a claim check that an authorized user or system can use to obtain the associated credit card number. In the event of a breach of one of the business applications or databases, only the tokens could be accessed, which would be of no value to a would-be attacker. With the tokenization approach, a central server issues a token to replace the credit card number in the application server. A benefit of this approach is that there is no need to encrypt or decrypt at every step in the application workflow, but only when the unencrypted number is specifically needed, such as for payment processing. In most steps of the application workflow, the token becomes a surrogate for the credit card number itself and may even be exchanged with other applications in the enterprise as if it was a real credit card number—without the overhead of decryption and re-encryption, or the risk of exposure.

In respect of tokenization compared to database encryption, this new approach in which the centralized server interfaces with databases and applications by issuing a token in place of the credit card number, offers significant benefits over traditional database encryption. First, unencrypted payment data is removed from the application and database at all times, which boosts security. Second, cryptographic processing is completely removed from the applications and database servers, which enhances application and database performance.

Further, tokens can improve security in many areas. By centralizing and tokenizing data, organizations gain the following security benefits:

Minimized exposure of data: As mentioned above, keeping of payment data in the minimum number of locations strengthens security by minimizing the number of potential targets for would-be attackers.

Segregation of card data from applications: Unencrypted data never resides in databases or in application memory. Application users never see payment data in clear text unless they have specific, valid permission.

Reduced exposure of keys: By centralizing keys on a secure server, an encryption management server optimally addresses the requirements that access to keys is restricted to the fewest number of custodians and that keys are stored securely in the fewest possible locations.

Impact of breach limited: With this approach, if an attacker somehow bypasses both the token and encryption, they will have access to only one card number. In contrast, with many encryption solutions, if an attacker gains access to one cryptographic key, they can potentially decrypt thousands or even hundreds of thousands of records.

Optimized Application Integration and Performance: Through employing an encryption management server, organizations can enjoy a range of advantages in integration and performance.

Improved application processing: Tokens can be passed between applications without requiring any encryption or decryption. Further, application and database servers are freed from having to do resource-intensive cryptographic processing. This can significantly streamline transactions across the enterprise.

Optimized application availability: Full key rotation can be realized without application downtime and can be scheduled to happen during maintenance windows to minimize the performance impact on applications during business hours.

Smart tokens: Smart tokens, tokens that feature embedded strings, can be used and can eliminate the need to do frequent decryption of data for reporting and related purposes.

Simplified Administration: Tokenization significantly eases the administrative burden of encryption, offering a range of administrative advantages.

Minimized compliance requirements: By removing payment data from disparate systems, the scope of PCI requirement 3 is drastically reduced. Instead of implementing encryption, managing keys, and implementing policies on multiple systems, only one central server will be the focus of PCI encryption efforts.

Streamlined key management: All keys and policies can be managed centrally, as opposed to having keys in multiple, distributed locations. This makes PCI-required tasks, such as key revocation and rotation, much faster and easier.

Centralized log management: With an encryption management server, administrators gain one centralized location that contains information on all decryption requests, which significantly eases compliance audits as well as surveillance and remediation efforts.

In addition to the tokenization in itself, there is also preferably additional security measures, such as:

Logging: The server should preferably track all decryption activity to provide an audit trail specifying who has decrypted sensitive payment data.

Secure access: Capabilities are preferably in place to ensure that only authorized staff can access administrative functions.

Performance and high availability: The server preferably supports high volumes of encryption routines and token requests without impeding the performance of associated applications and workflow. In addition, the server preferably enables for continuous processing, even in the event of a server outage.

Specific embodiments of the invention have now been described. However, several alternatives are possible, as would be apparent for someone skilled in the art. For example, the methodology herein described can be used for any type of sensitive character sets, and not only CCNs. Further, the system may comprise any level of hierarchical levels'. Still further, it is possible to use only one set of tokens within the system, or a multitude of different tokens, and the tokens may be uniquely assigned to each transaction/occasion, each original set of sensitive sets of characters, such as each CCN, and/or each individual. Still further, the implementation of the control method could be accomplished in different ways, such as in especially dedicated hardware or in software for control of already existing control means.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for secure handling of sensitive sets of characters in a distributed hierarchical system comprising at least one local server on a lower hierarchic level and at least one central server at a higher hierarchic level, the method comprising:
receiving a sensitive set of characters at the local server;
replacing a portion of the sensitive set of characters with a token from a token table that maps at least two token values to each possible combination of digits of the portion of the sensitive set of characters to form a tokenized set of characters, wherein the token is chosen randomly from between the at least two token values, and wherein the token belongs to a subset of possible tokens assigned to the local server by the central server;
transferring at least one of the sensitive set of characters and the tokenized set of characters to the central server;
deleting the sensitive set of characters from the local server within a predetermined amount of time from the transferring; and
storing the tokenized set of characters in a local database connected to the local server.

2. The method of claim 1, wherein the sensitive set of characters is at least one of a number associated with personal information related to an individual and a number associated with financial holdings and transactions.

3. The method of claim 2, wherein the sensitive set of characters is at least one of a credit card number, a bank account number, a social security number, a driver license number and a birth certificate number.

4. The method of claim 1, wherein the sensitive set of characters comprises at least one subset of characters generated in a random fashion, wherein the portion is contained within the subset of random characters.

5. The method of claim 4, wherein the sensitive set of characters comprises at least 16 characters and wherein the portion comprises at least 6 characters.

6. The method of claim 1, wherein deleting the sensitive set of characters from the local server is performed at least once every 24 hours.

7. The method of claim 1, wherein the subset of possible tokens assigned to the local server by the central server is transferred from the central server to the local server.

8. The method of claim 7, wherein the token table is replaced periodically at the local server.

9. The method of claim 7, wherein the hierarchical system comprises at least two local servers, and wherein the token table is a general token table assigned to all the local servers.

10. The method of claim 7, wherein the hierarchical system comprises at least two local servers, and wherein the token table is a unique local token table assigned to each of the local servers, the local token tables comprising tokens belonging to different subsets of possible tokens.

11. The method of claim 1, wherein there are at least two local servers, and each local server is assigned a different subset of possible tokens by the central server.

12. The method of claim 1, further comprising generating a hash value for the sensitive set of characters, and storing the hash value in association with the tokenized set of characters in the local database connected to the local server.

13. The method of claim 1, wherein transferring the at least one of the sensitive set of characters and the tokenized set of characters to the central server comprises encrypting the at least one of the sensitive set of characters and the tokenized set of characters with an encryption key prior to transferring.

14. The method of claim 13, wherein the encryption key is renewed periodically, wherein renewing the encryption key comprises generating a renewed encryption key based on the encryption key and subsequently erasing the encryption key.

15. The method of claim 1, further comprising monitoring the frequency of replacing a portion of a sensitive set of characters with a token to form a tokenized set of characters at each local server, and issuing an alarm if a determined threshold level is exceeded.

16. The method of claim 1, wherein the subset of possible tokens assigned to the local server by the central server is assigned in the form of at least one range of numerical or alphanumerical token values reserved by the central server for each one of the at least one local server, for dynamic generation of token values by the local server within the range.

17. The method of claim 1, wherein the subset of possible tokens assigned to the local server by the central server is assigned in the form of a static token table provided by the central server.

18. The method of claim 1, wherein receiving a sensitive set of characters in the local server and replacing a portion of the sensitive set of characters with a token to form a tokenized set of characters are performed locally at the local server.

19. The method of claim 1, wherein replacing a portion of the sensitive set of characters with a token to form a tokenized set of characters further comprises performing a check-sum test for the tokenized set of characters, and, responsive to a failed check-sum test, replacing the portion with another token.

20. A method for securely handling sensitive sets of characters in a distributed hierarchical system comprising a primary local server and a secondary local server, wherein the hierarchic level of the primary local server is higher than the hierarchic level of the secondary local server, and comprising:

receiving a sensitive set of characters at the secondary local server;

transferring the sensitive set of characters to the primary local server;

deleting the sensitive set of characters from the primary local server within a predetermined amount of time from the transferring;

replacing, at the primary local server, a portion of the sensitive set of characters with a token from a token table that maps at least two token values to each possible combination of digits of the portion of the sensitive set of characters to form a tokenized set of characters, wherein the token is chosen randomly from between the at least two token values, and wherein the token belongs to a subset of possible tokens assigned to the primary local server by the central server;

transferring, from the primary local server, at least one of the sensitive set of characters and the tokenized set of characters to the central server;

deleting the sensitive set of characters from the primary local server within a predetermined amount of time from the transferring; and storing the tokenized set of characters in a local database connected to the primary local server.

21. A method for securely handling sensitive sets of characters in a distributed hierarchical system comprising a primary central server and a secondary central server, wherein the hierarchic level of the primary central server is higher than the hierarchic level of the secondary local server, and comprising:

receiving, at the secondary central server, from a local server, a sensitive set of characters;

replacing, at the secondary central server, a portion of the sensitive set of characters with a token from a token table that maps at least two token values to each possible combination of digits of the portion of the sensitive set of characters to form a tokenized set of characters, wherein the token is chosen randomly from between the at least two token values, and wherein the token belongs to a subset of possible tokens assigned to the secondary central server by the primary central server;

transferring at least one of the sensitive set of characters and the tokenized set of characters to the primary central server; and storing the sensitive set of characters and the tokenized set of characters in a central database connected to at least one of the primary and secondary central server.

22. A system for secure handling and storing of sensitive sets of characters, the system comprising a distributed hierarchical environment with at least one local server on a lower hierarchic level and at least one central server at a higher hierarchic level, the at least one local server comprising:

a non-transitory computer readable storage medium storing executable program code comprising code for:

receiving a sensitive set of characters at the local server;

replacing a portion of the sensitive set of characters with a token from a token table that maps at least two token values to each possible combination of digits of the portion of the sensitive set of characters to form a tokenized set of characters, wherein the token is chosen randomly from between the at least two token values, and wherein the token belongs to a subset of possible tokens assigned to the local server by the central server;

transferring at least one of the sensitive set of characters and the tokenized set of characters to the central server;

deleting the sensitive set of characters from the local server within a predetermined amount of time from the transferring; and storing the tokenized set of characters in a local database connected to the local server; and a processor for executing the program code.

* * * * *